US012566297B2

(12) United States Patent     (10) Patent No.:   US 12,566,297 B2

Cheung et al.     (45) Date of Patent:     Mar. 3, 2026

(54) 2X2 PHOTONIC SPLITTER USING MODE CONVERTING Y-JUNCTIONS

(71) Applicant: X Development LLC, Mountain View, CA (US)

(72) Inventors: Alfred Ka Chun Cheung, Belmont, CA (US); Yi-Kuei Ryan Wu, San Jose, CA (US)

(73) Assignee: X Development LLC, Mountain View, CA (US)

( * ) Notice: Subject to any disclaimer, the term of this patent is extended or adjusted under 35 U.S.C. 154(b) by 321 days.

(21) Appl. No.: 18/399,413

(22) Filed: Dec. 28, 2023

(65) Prior Publication Data

US 2025/0216611 A1    Jul. 3, 2025

(51) Int. Cl.
    *G02B 6/28*       (2006.01)
(52) U.S. Cl.
    CPC ................................. *G02B 6/2821* (2013.01)
(58) Field of Classification Search
    None
    See application file for complete search history.

(56) References Cited

U.S. PATENT DOCUMENTS

| | | | |
|---|---|---|---|
| 7,856,163 | B2 | 12/2010 | Saida et al. |
| 10,429,581 | B1 | 10/2019 | Thomas et al. |
| 10,451,804 | B2 | 10/2019 | Liu et al. |
| 10,677,987 | B1 | 6/2020 | Dumais |
| 11,187,854 | B2 | 11/2021 | Schubert et al. |
| 11,360,268 | B1 | 6/2022 | Ling et al. |
| 11,609,392 | B1 | 3/2023 | Wu |
| 2007/0217739 | A1 | 9/2007 | McGreer et al. |
| 2015/0104128 | A1 | 4/2015 | Oka et al. |
| 2020/0257127 | A1 | 8/2020 | Lin |

(Continued)

FOREIGN PATENT DOCUMENTS

| | | |
|---|---|---|
| CN | 117043650 A | 11/2023 |
| TW | 202146955 A | 12/2021 |

OTHER PUBLICATIONS

PCT International Search Report and Written Opinion mailed Jan. 23, 2025, in corresponding International application No. PCT/US2024/051773, 8 pages.

(Continued)

*Primary Examiner* — Chad H Smith
(74) *Attorney, Agent, or Firm* — Christensen O'Connor Johnson Kindness PLLC

(57)         ABSTRACT

A 2×2 photonic splitter includes two mode converting Y-junctions. A first stage mode converting Y-junction includes input branch ports adapted to receive an input optical signal propagating in a fundamental spatial mode at either of the input branch ports, a first trunk port, and a first mode converting region. The first mode converting region is adapted to convert at least a first power portion of the fundamental spatial mode of the input optical signal when received via at least one of the input branch ports to a higher order spatial mode at the first trunk port. The second stage mode converting Y-junction includes output branch ports adapted to emit output optical signals having the fundamental spatial mode, a second trunk port, and a second mode converting region optically coupling the output branch ports to the second trunk port. A connected trunk section photonically links the trunk ports.

20 Claims, 11 Drawing Sheets

MODE CONVERTING Y-JUNCTION 301 (1ST STAGE)

MODE CONVERTING Y-JUNCTION 302 (2ND STAGE)

300

345

340

P-A

50%

100% FND (TE0)

320

INPUT BRANCH PORTS 310

342

CONNECTED TRUNK SECTION 305

TRUNK PORT 330

P-C

50% FND (TE0)
100% FND (TE0)

OUTPUT BRANCH PORTS 325

50%

TRUNK PORT 315

P-B

335

50% FND (TE0)

P-D

345

(56) References Cited

U.S. PATENT DOCUMENTS

| | | | |
|---|---|---|---|
| 2021/0088736 A1* | 3/2021 | Li | G02B 6/2766 |
| 2022/0373739 A1 | 11/2022 | Abril et al. | |
| 2023/0054228 A1 | 2/2023 | Capasso et al. | |
| 2023/0258867 A1* | 8/2023 | Ginis | G02B 6/126 |
| | | | 385/15 |
| 2023/0266542 A1 | 8/2023 | Wu | |

OTHER PUBLICATIONS

Tseng et al., "Variable splitting ratio 2x2 MMI couplers using multimode waveguide holograms", Optics Express, vol. 15, No. 14, Jul. 9, 2007, 7 pages.

Lu et al., "On-chip reconfigurable mode converter based on cross-connected subwavelength Y-junctions", Photonics Research, vol. 9, No. 1, Jan. 2021, pp. 43-48.

Callewaert et al., "Inverse design of an ultra-compact broadband optical diode based on asymmetric spatial mode conversion", Scientific Reports | 6:32577 | DOI: 10.1038/srep32577, <www.nature.com/scientificreports> published Sep. 2, 2016, 10 pages.

Liu et al., "Ultra-compact photonic crystal waveguide spatial mode converter and its connection to the optical diode effect", Optical Society of America, Dec. 17, 2012, vol. 20, No. 27, Optics Express 28388, 10 pages.

Yilmaz et al. "Inverse design of efficient and compact 1xN wavelength demultiplexer", Elsevier, Optics Communications, vol. 454, Jan. 1, 2020, 124522, 7 pages.

TW Office Action mailed Jan. 6, 2026, in corresponding ROC (Taiwan) Patent Application No. 113142431, 5 pages.

* cited by examiner

FIG. 2A                 FIG. 2B

LOSSY 2X2 BEAM SPLITTER

FUNDAMENTAL MODE (E.G., TE0)

FIRST ORDER EXCITED MODE (E.G., TE1)

SECOND ORDER EXCITED MODE (E.G., TE2)

MODE CONVERTING Y-JUNCTION
VIRTUAL PORTS

S-PARAMETER MATRIX
(FOR STAGE1&2)

$$L(x) = (|S_{2f,1f}(x)|^2 - 0.5)^2 + (|S_{3f,1f}(x)|^2 - 0.5)^2 + (|S_{1e,2f}(x)|^2 - 0.5)^2 + (|S_{1e,3f}(x)|^2 - 0.5)^2$$

MODE CONVERTING
Y-JUNCTION 505A
(STAGE1; P-A EXCITED)

MODE CONVERTING
Y-JUNCTION 505B
(STAGE2)

345

P-A

100% FND

340

P-C

50% FND 442                    442

100%
EXC

INPUT
BRANCH
PORTS 310

OUTPUT
BRANCH
PORTS 325

315        342        330

P-B

500

CONNECTED
TRUNK SECTION 515

50% FND

P-D

345

MODE CONVERTING
Y-JUNCTION 505A
(STAGE1; P-B EXCITED)

MODE CONVERTING
Y-JUNCTION 505B
(STAGE2)

345

P-A

P-C

50% FND 441                    441

100%
FND

INPUT
BRANCH
PORTS 310

OUTPUT
BRANCH
PORTS 325

342

340

100% FND

P-B

500

CONNECTED
TRUNK SECTION 515

50% FND

P-D

345

550

S-PARAMETER MATRIX (FOR STAGE1)

|      | 1F  | 2F  | 3F  | 1E  |
|------|-----|-----|-----|-----|
| 1F   |     |     |  1  |     |
| 2F   |     |     |     |  1  |
| 3F   |  1  |     |     |     |
| 1E   |     |  1  |     |     |

$\bullet \ 1/\sqrt{2}$ $$L(x) = (|S_{3f,1f}(x)|^2 - 0.5)^2 + (|S_{1e,2f}(x)|^2 - 0.5)^2$$

TRUNK PORT 315

560

460

P-A

P-C

P-B

P-D

2X2 PHOTONIC SPLITTER USING MODE CONVERTING Y-JUNCTIONS

TECHNICAL FIELD

This disclosure relates generally to photonic devices, and in particular but not exclusively, relates to photonic splitters.

BACKGROUND INFORMATION

A photonic splitter is a device that splits the optical power of an input optical signal into multiple output optical signals in a predictable manner. A beam splitter is an example of a basic photonic splitter that relies upon a partially transmissive/reflective interface layer (e.g., a refractive boundary, multilayer dichroic films, etc.). A more sophisticated example of a photonic splitter is a multimode interferometer or multimode interference (MMI) coupler. MMI couplers have gained popularity due to their versatility as power splitters, interferometers, optical switches, etc.

FIG. 1 illustrates a conventional 2×2 MMI coupler 100 that includes two pairs of coupling waveguide ports 105 connected via a MMI region 110. The optical power of the input optical signal 115 is split between two output ports 105 due to modal dispersion and constructive/destructive interference between the fundamental and higher order modes of propagation (multimode beating) within MMI region 110. Conventional MMI couplers have rectilinear MMI regions and do not in practice provide lossless 50/50 power splitting. In fact, MMI couplers are particularly susceptible to fabrication variances, which lead to lossy, power split imbalances. Conventional techniques apply adiabatic design principles to MMI region 110 to improve splitting uniformity and reduce losses. However, these adiabatic design principles typically include lengthening MMI region 110 to provide adequate distance for the multimode interference to occur while maintaining the rectilinear shape. This leads to a larger overall device and still may not achieve the desired performance specifications (e.g., splitting imbalance, power loss) over a desired range of operating wavelengths.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described.

FIGS. 2A-C illustrate why coupling two conventional Y-branch waveguides trunk-to-trunk form a lossy bi-directional 2×2 photonic splitter, in accordance with an embodiment of the disclosure.

FIG. 5C illustrates a scattering matrix and a loss function used during inverse design of a mode converting Y-junction, in accordance with an embodiment of the disclosure.

DETAILED DESCRIPTION

Figure 1:
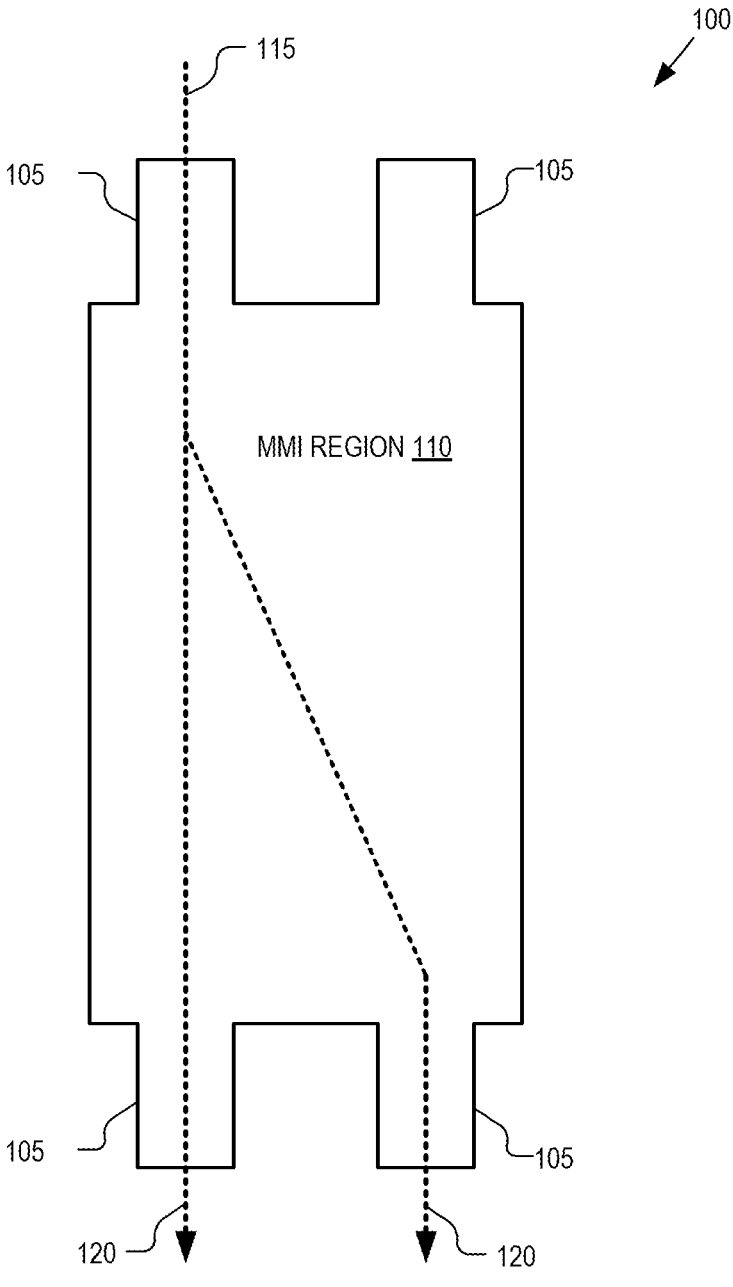
FIG. 1 (PRIOR ART) is a block diagram illustrating a conventional 2×2 optical splitter.

Embodiments of a system, apparatus, and method of operation for a 2×2 beam/photonic spitter that uses mode converting Y-junctions are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

A 2×2 photonic splitter is a four port photonic device having two input ports and two output ports. The 2×2 photonic splitter (also referred to as a 2×2 beam splitter), is capable of receiving an optical signal on either input port and splits the optical signal between its two output ports. An ideal 2×2 photonic splitter is lossless and typically provides an equal 50/50 power split of the optical signal between the output ports. In practice, realizable 2×2 photonic splitters are somewhat lossy and may not provide a perfect 50/50 power split ratio.

2×2 photonic splitters have many important applications that engender significant commercial interest. For example, 2×2 photonic splitters have applications in interferometry, photonic modulators, optical computing, and otherwise. The size of a 2×2 photonic splitter can be particularly important in optical computing that uses matrix structures of 2×2 splitters along with phase shifters to perform optical multiplication.

Embodiments described herein disclose 2×2 photonic splitters having high efficiency and relatively small form factors for high density, high efficiency applications. The disclosed 2×2 photonic splitters use a pair of trunk-to-trunk coupled mode converting Y-junctions to implement the 2×2 splitting function. In some embodiments both mode converting Y-junctions may be implemented using one or more inverse designed patterns. In other embodiments, just one of the mode converting Y-junctions is inverse designed while more conventional waveguide structure/pattern may be used to implement the other mode converting Y-junction. Since these mode converting Y-junctions may be implemented using inverse design techniques, it should be appreciated that the terminology "Y-junction" has been used herein to connote the functional combining and splitting of optical signals between two branch ports and a trunk port of the "Y-junction" and not that the physical structure itself must resemble a 'Y' shape.

Figure 2C:
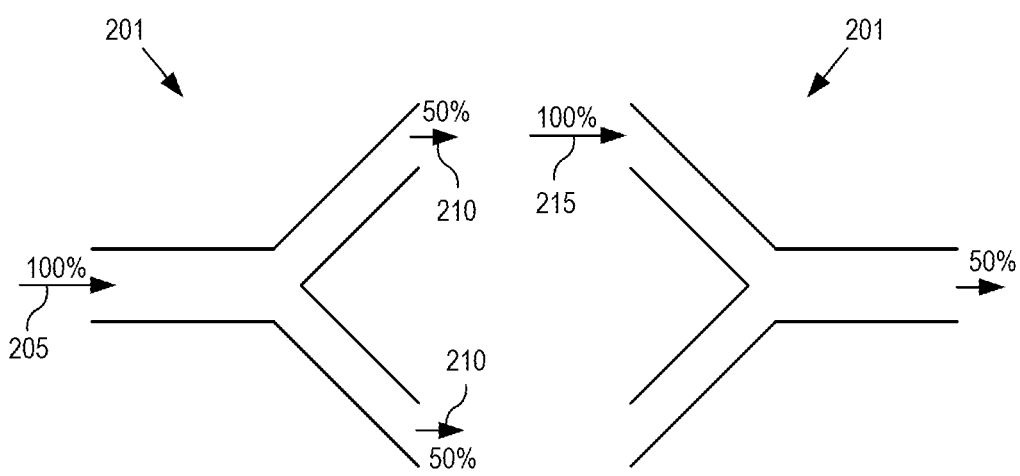
Figure 2C:
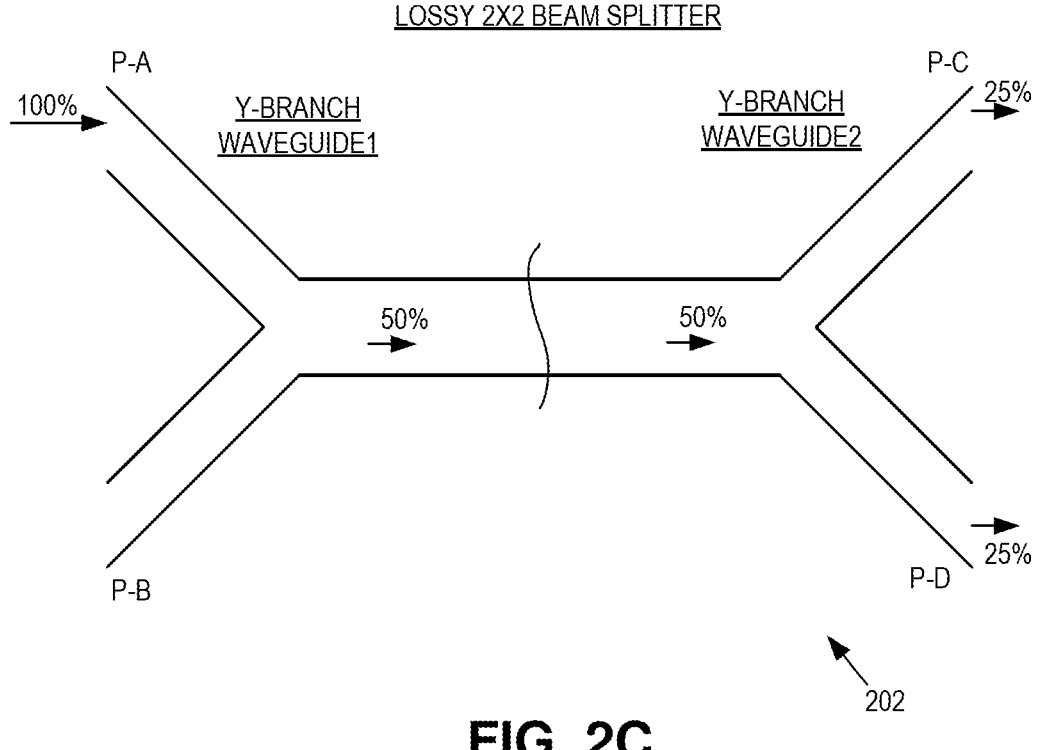

A 1×2 Y-splitter is a much simpler structure than a 2×2 photonic splitter. Naively, one may assume that two 1×2 Y-splitters could simply be coupled trunk-to-trunk to implement a 2×2 splitting function. However, the principle of reciprocity in electromagnetism does not permit this simple structure without significant loss. Referring to FIG. 2A, a simple Y-splitter 201 could be designed to 50/50 power split an input signal 205 injected into the trunk port of Y-splitter 201, which is then split 50/50 and emitted as output signals 210 from the branch ports each having 50% of the input power (ideally). However, the principle of reciprocity demands that a signal 215 injected into a branch port of Y-splitter 201 in the opposite direction will also have 50% power at the trunk port (see FIG. 2B). The remaining 50% of the optical power is simply lost in the junction of the Y-splitter. Referring to FIG. 2C, a 2×2 photonic splitter 202 formed by simply connecting two instances of Y-splitters trunk-to-trunk results in a lossy structure that ideally loses 50% of the optical power and in practice would be even more lossy. The high losses incurred by 2×2 photonic splitter 202 is required by the principle of reciprocity if the structure operates solely in a single spatial mode. However, an ideal lossless 2×2 photonic splitter can be designed by leveraging spatial mode conversions to comply with the principle of reciprocity while achieving lossless behavior (ideally). Of course, in reality some loss is unavoidable.

Figure 3A:
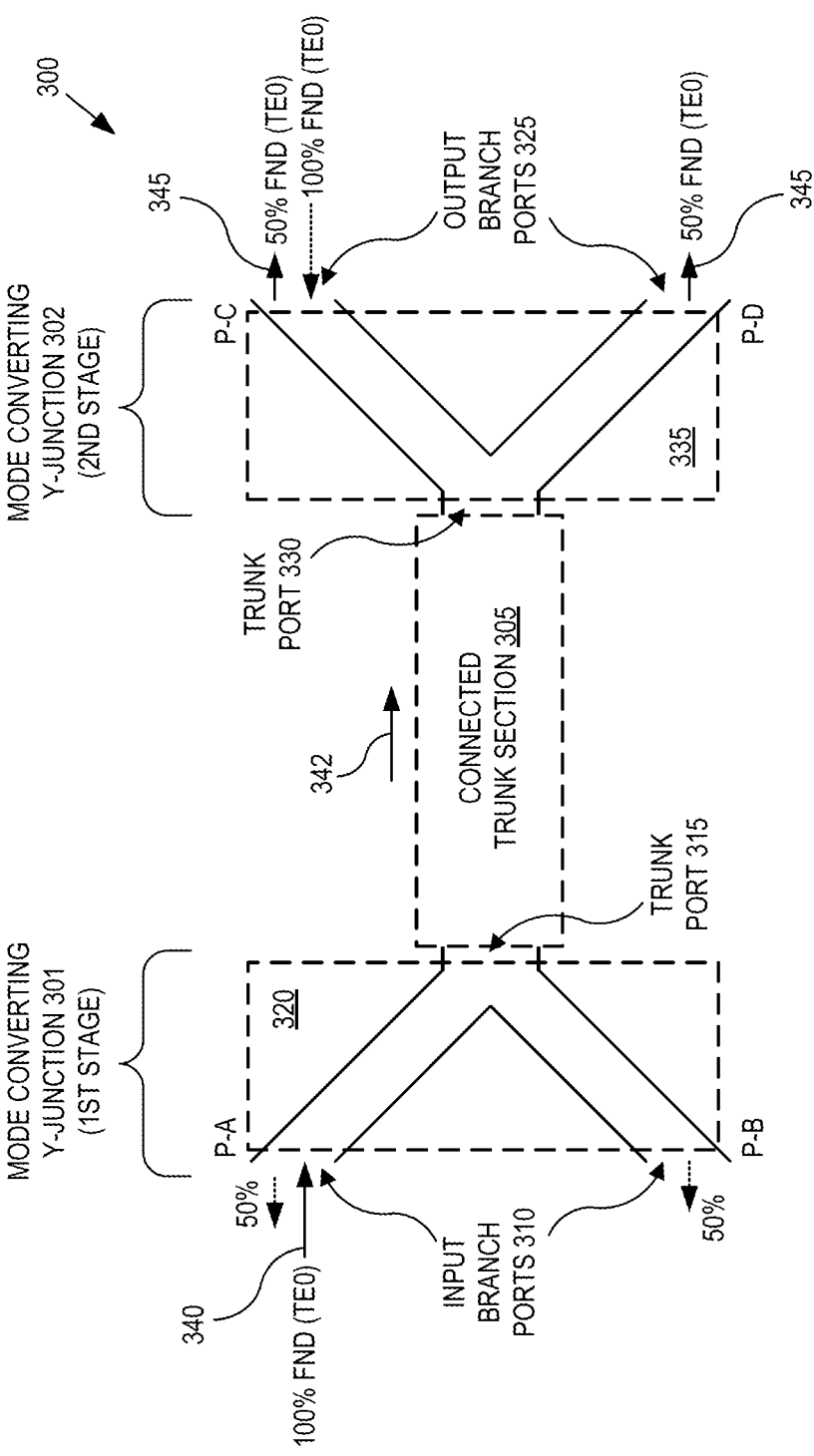
FIG. 3A is a functional block diagram illustrating a low loss bi-directional 2×2 photonic splitter using mode converting Y-junctions, in accordance with an embodiment of the disclosure.

FIG. 3A is a functional block diagram illustrating a low loss bi-directional 2×2 photonic splitter 300 using mode converting Y-junctions 301 and 302, in accordance with an embodiment of the disclosure. The illustrated embodiment of 2×2 photonic splitter 300 (referred to simply as "splitter 300" for convenience) includes two mode converting Y-junctions 301 and 302 coupled trunk-to-trunk via a connected trunk section 305. The illustrated embodiment of mode converting Y-junction 301 includes input branch ports 310, a trunk port 315, and a mode converting region 320. The illustrated embodiment of mode converting Y-junction 302 includes output branch ports 325, a trunk port 330, and a mode converting region 335. When specificity demands, input branch ports 310 may also be referenced by their specific port labels P-A and P-B and output branch ports 325 may be referenced by their specific port labels P-C and P-D. Since 2×2 photonic splitter 300 is bi-directional, the designation of an input and output side is merely for convenience just as the designation of mode converting Y-junction 301 as the "first stage" and designation of mode converting Y-junction 302 as the "second stage" is merely for convenience.

Figure 3B:
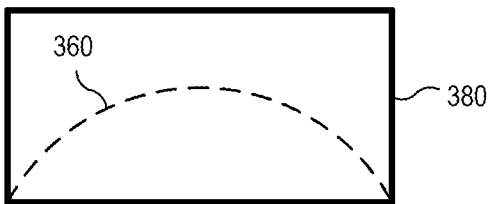
FIG. 3B illustrates examples of fundamental and higher order spatial modes.
Figure 3B:
Figure 3B:
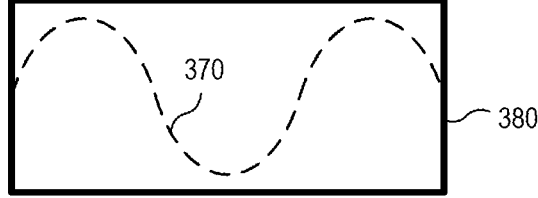

Splitter 300 obtains 100% splitting efficiency (ideally) by leveraging conversions between the fundamental and higher order spatial modes to comply with the principle of reciprocity without incurring 50% efficiency loss as described in FIGS. 2A-C. Input optical signal 340 is received at port P-A and output optical signals 345 are emitted from output branch ports 325 with substantially 100% of their optical power propagating in the fundamental spatial mode (e.g., TEO). However, mode converting Y-junctions 301 and 302 selectively convert some of this optical power to higher order spatial modes of intermediate optical signals 342 propagating along connected trunk section 305 to comply with the principle of reciprocity. FIG. 3B illustrates spatial modes, including a fundamental spatial mode 360 of the input and output optical signals and higher order spatial modes 365 or 370 that may also be propagating within connected trunk section 305. In one embodiment, connected trunk section 305 includes a planar waveguide 380, such as a slab waveguide, a rib waveguide, a ridge waveguide, or otherwise. FIGS. 4 and 5 illustrate two possible implementations for leveraging higher order spatial modes, such as spatial modes 365 or 370, to achieve high efficiency bi-directional 2×2 splitting.

Figure 4A:
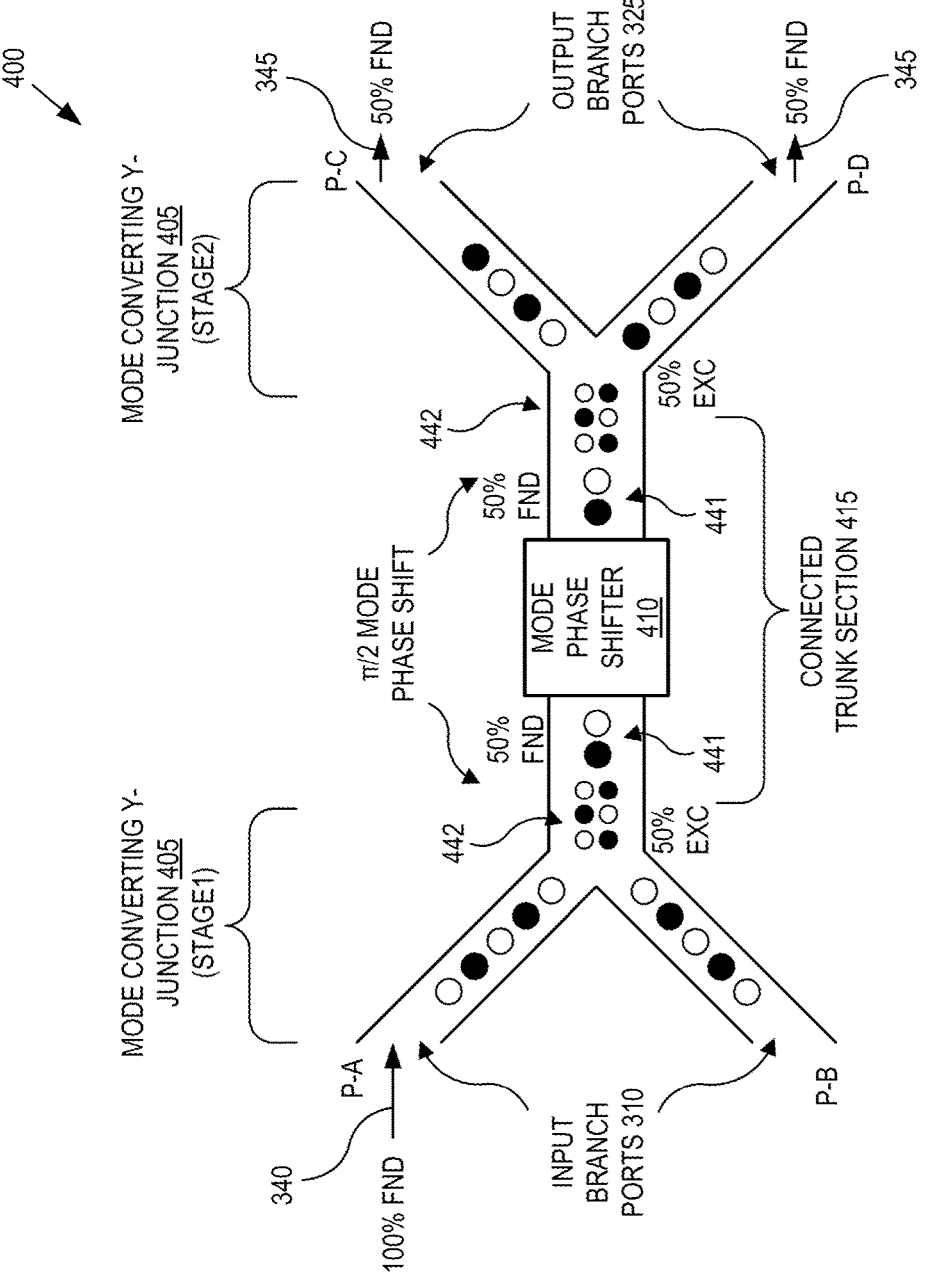
FIG. 4A is a functional block diagram illustrating a low loss bi-directional 2×2 photonic splitter using mode converting Y-junctions linked trunk-to-trunk via a mode phase shifter, in accordance with an embodiment of the disclosure.

FIG. 4A is a functional block diagram illustrating a low loss bi-directional 2×2 photonic splitter 400 using mode converting Y-junctions 405 linked trunk-to-trunk via a mode phase shifter 410 integrated into connected trunk section 415, in accordance with an embodiment of the disclosure. Splitter 400 is one possible implementation of splitter 300.

In the illustrated embodiment, mode converting junction 405 is used to implement both the first and second stages. In other words, a common physical structure with a common mode converting region implements both the $1^{st}$ and $2^{nd}$ stage mode converting Y-junction. On the input side (stage 1), mode converting junction 405 receives input optical signal 340 having all optical power propagating in a fundamental spatial mode. Input optical signal 340 is illustrated as being received on port P-A; however, mode converting junction 405 (stage 1) will treat input optical signal 340 the same regardless of which input branch port 310 (e.g., P-A or P-B) it is received. The mode converting region of mode converting Y-junction 405 converts a first portion of the optical power of input optical signal 340 to a higher order spatial mode 442 while retaining a second portion of the optical power in the fundamental spatial mode 441. In the illustrated embodiment, this power split ratio is approximately 50/50. Of course, in reality the power split ratio may deviate from ideal 50/50 (e.g., less than 1%, 2%, or 5% deviation). As the mixture of fundamental and higher order spatial modes 441/442 co-propagate along connected trunk section 415, mode phase shifter 410 introduces a pi/2 radians phase shift between the fundamental and higher order spatial modes 441/442. The 10econdd stage mode converting Y-junction 405 performs the reciprocal functions of the first stage by 50/50 power splitting the fundamental and higher order spatial modes 441/442 to output branch ports 325 while also converting the optical power in the higher order spatial mode 442 back to the fundamental spatial mode for output optical signals 345. The pi/2 phase shift ensures the fundamental and higher order spatial modes 441/442 propagating along connected trunk section 415 constructively recombine without significant loss. In one embodiment, mode phase shifter 410 may be implemented as a specifically designed element (e.g., inverse designed) distinct from, or integrated into, a waveguide structure of connected trunk section 415. Alternatively, mode phase shifter 410 may be implemented by the waveguide structure itself of connection trunk section 415. Since fundamental and higher order spatial modes experience different effective refractive indexes, connected trunk section 415 may be designed to a specific length that introduces the pi/2 phase shift between fundamental spatial mode 441 and higher order spatial mode 442. Of course, a specifically engineered structure (e.g., inverse designed structure) is expected to provide a larger operational bandwidth than a simple waveguide section (e.g., slab waveguide, rib waveguide, ridge waveguide, optic fiber, etc.).

Figure 4B:
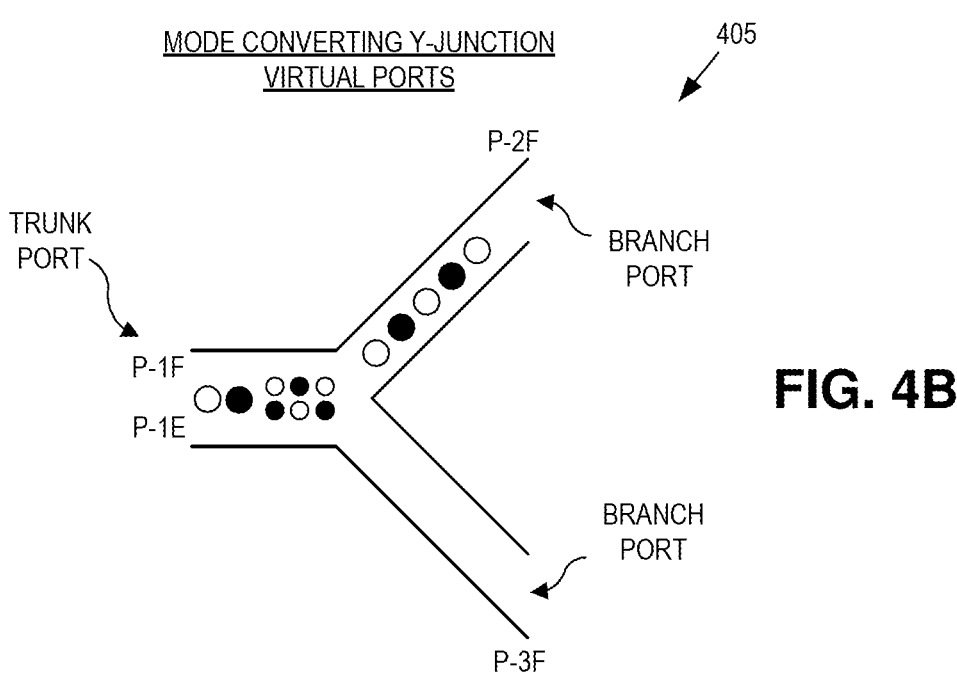
FIG. 4B illustrates virtual port notation of a mode converting Y-junction, in accordance with an embodiment of the disclosure.
Figure 4C:
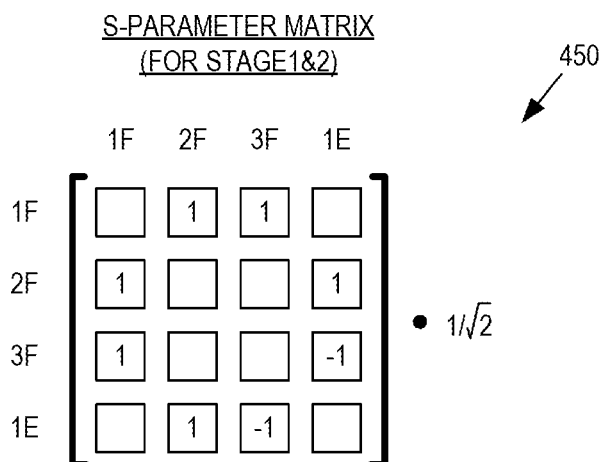
FIG. 4C illustrates a scattering matrix and a loss function used during inverse design of a mode converting Y-junction, in accordance with an embodiment of the disclosure.

FIGS. 4B and 4C further illustrate the mode converting and power splitting/combining functions performed by mode converting Y-junctions 405. FIG. 4B assigns virtual port labels to the fundamental and higher order spatial modes at each physical port. For example, the trunk port is assigned virtual ports P-1F and P-1E for the fundamental and higher order spatial modes, respectively, at port 1. The branch ports are assigned virtual ports P-2F and P-3F since the branch ports only communicate optical power in the fundamental spatial mode for the operational purposes described herein.

FIG. 4C illustrates a scattering matrix (s-matrix) 450 having columns and rows corresponding to the virtual port labels from FIG. 4B. The behavior of mode converting Y-junctions 405 may be described using the scattering-parameters (s-parameters) populated within s-matrix 450. S-matrix 450 is a symmetrical matrix along its diagonal (upper left to lower right diagonal). Letting i,j be the indices of s-matrix 450, these values are labels for the four relevant virtual ports labelled in FIG. 4B. S-matrix 450 may be referenced to construct a loss function L(x) (see FIG. 4C) used to design the mode converting region of mode converting Y-junction 405 using inverse design techniques. A loss function that pushes the four relevant $S_{i,j}$ values to have an amplitude squared equal to $(1/\sqrt{2})\ 2=0.5$ may be used. There are many forms the loss function can take, but one of the most simple forms is a mean squared error term:

$$\text{Loss}(L) =$$
$$\left(|S_{2f,1f}|^2 - 0.5\right)^2 + \left(|S_{3f,1f}|^2 - 0.5\right)^2 + \left(|S_{1e,2f}|^2 - 0.5\right)^2 + \left(|S_{1e,3f}|^2 - 0.5\right)^2$$

Loss (L) only explicitly includes four terms, since the other four terms are implied by reciprocity. When using Loss (L) for inverse design, the loss equation may be specified with respect to a set of design variables x and therefore $S_{i,j}$ is a function of x and the loss function may likewise be specified as a function of x, as follows:

$$L(x) = \left(|S_{2f,1f}(x)|^2 - 0.5\right)^2 +$$
$$\left(|S_{3f,1f}(x)|^2 - 0.5\right)^2 + \left(|S_{1e,2f}(x)|^2 - 0.5\right)^2 + \left(|S_{1e,3f}(x)|^2 - 0.5\right)^2$$

Inverse design of mode converting Y-junction 405 may be accomplished as follows. An inverse design simulator (aka design model) is configured with an initial design, such as a simple Y-branch, and operated to perform a forward operational simulation of the initial design (e.g., using Maxwell's equations for electromagnetics). The output of the forward operational simulation is a simulated field response at trunk port 315. Specific performance parameters of this output field response may be selected as parameters of interest (e.g., power loss, optical power in each spatial mode, etc.) and are referred to as simulated performance parameters. The simulated performance parameters are used by a performance loss function (e.g., L(x) mentioned above) to calculate a performance loss value, which may be a scalar value (e.g., mean square difference between simulated performance values and target performance values). The differentiable nature of the design model enables a backpropagation via an adjoint simulation of a performance loss error, which is the difference between the simulated output values and the desired/target performance values. The performance loss error is backpropagated through the design model during the adjoint simulation to generate loss gradients. Backpropagation of the performance loss error facilitates the computation of these loss gradients, such as structural gradients that represent the sensitivity of the performance loss value to changes in the structural material properties (e.g., topology, material types, etc.). These gradients are output as a structural design error, which may then be used by a structural optimizer to perform an iterative gradient descent (e.g., stochastic gradient descent) that optimizes or refines the initial structural design to generate a revised structural design. The forward and reverse simulations may then be iterated until the performance loss value falls within acceptable design criteria. The above description is merely an example inverse design technique that may be used to refine or optimize the features and topology of mode converting Y-junction 405. It is appreciated that other inverse design techniques alone, or in combination with other conventional design techniques, may also be implemented.

Figure 4D:
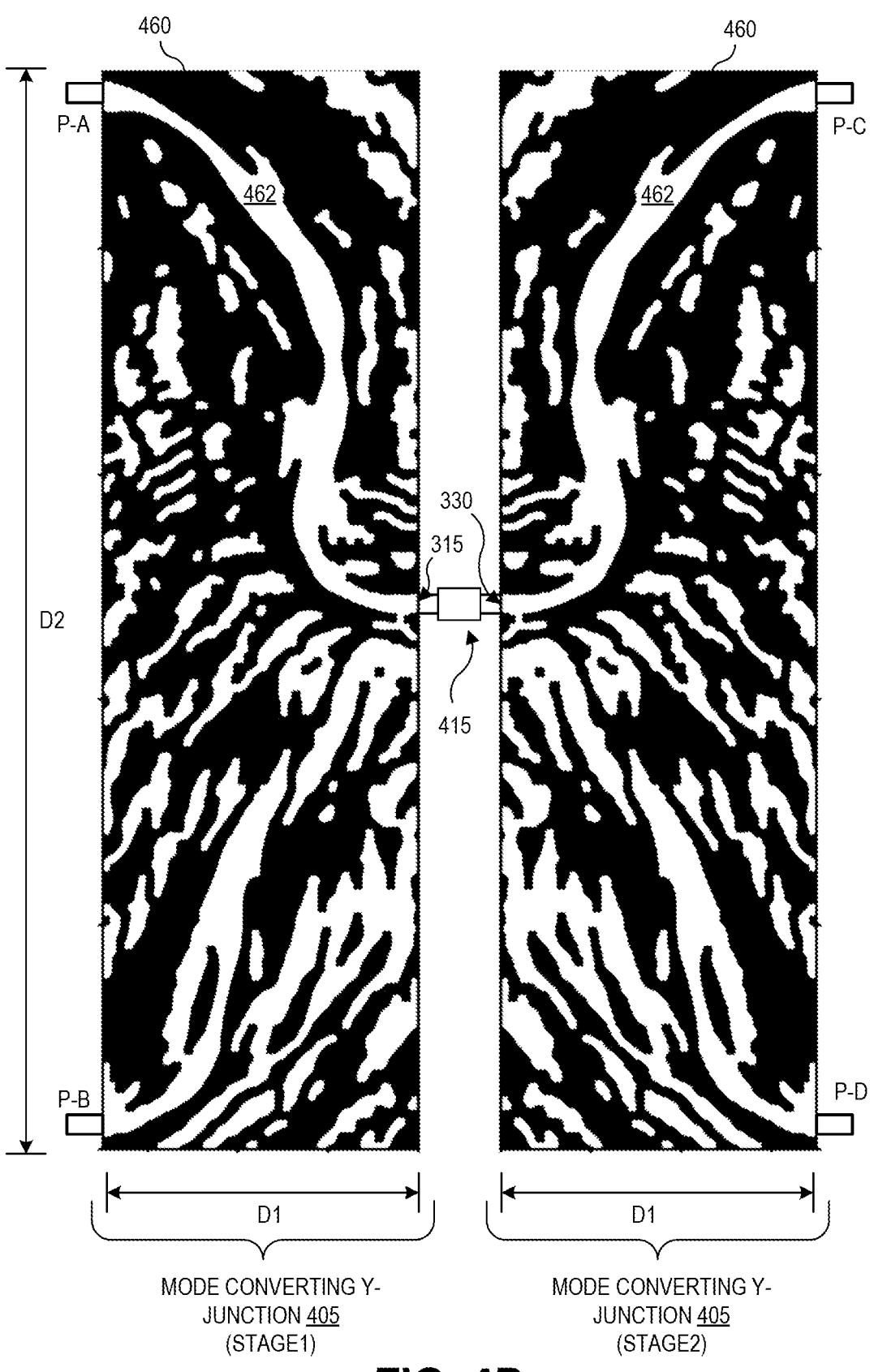
FIG. 4D illustrates an inverse designed pattern used to implement the mode converting regions of mode converting Y-junctions, in accordance with an embodiment of the disclosure.

FIG. 4D illustrates inverse designed patterns 460 used to implement the mode converting regions of each mode converting Y-junction 405, in accordance with an embodiment of the disclosure. Patterns 460 represent one possible inverse designed implantation of both mode converting regions 320 and 335 illustrated in FIG. 3A. Accordingly, in the embodiment of FIG. 4D, mode converting regions 320 and 335 may be fabricated using a common pattern with common features.

Inverse designed patterns 460 may be implemented using at least two materials of differing refractive index. In one embodiment, these materials include a higher index material (e.g., silicon) and a lower index material (e.g., silicon dioxide) arranged into the illustrated pattern. Pattern 460 may be fabricated using conventional semiconductor deposition and etching techniques. Patterns 460 are each non-symmetrical along both orthogonal axes and include irregularly shaped features defined by the refractive materials. In FIG. 4D, the white portions represent the higher refractive index material while the black portions represent the lower refractive index material. Although patterns 460 may assume a variety of different dimensions, in one embodiment, D1 is approximately 7 µm and D2 is approximately 24 µm.

Pattern 460 includes a number of irregularly shaped features defined by the refractive materials. Many of these features may deviate from the illustrated pattern while achieving nearly similar efficient operation. However, some notable features include an irregularly shaped channel 462 of higher index material extending continuously and circuitously from branch port P-A (or port P-C) to a trunk port (e.g., trunk ports 315 or 330). In contrast, it is also notable that branch ports P-B or P-D do not include continuous channels of the higher index material extending to their respective trunk ports. Rather, branch ports P-B and P-D are connected to fjord-like features of the higher index material. Patterns 460 also include a plurality of other irregularly shaped "islands" of the higher index material disposed within and throughout the lower index material. These irregularly shaped islands are separate and distinct from irregularly shaped channel 462.

Figures 5A, 5B:
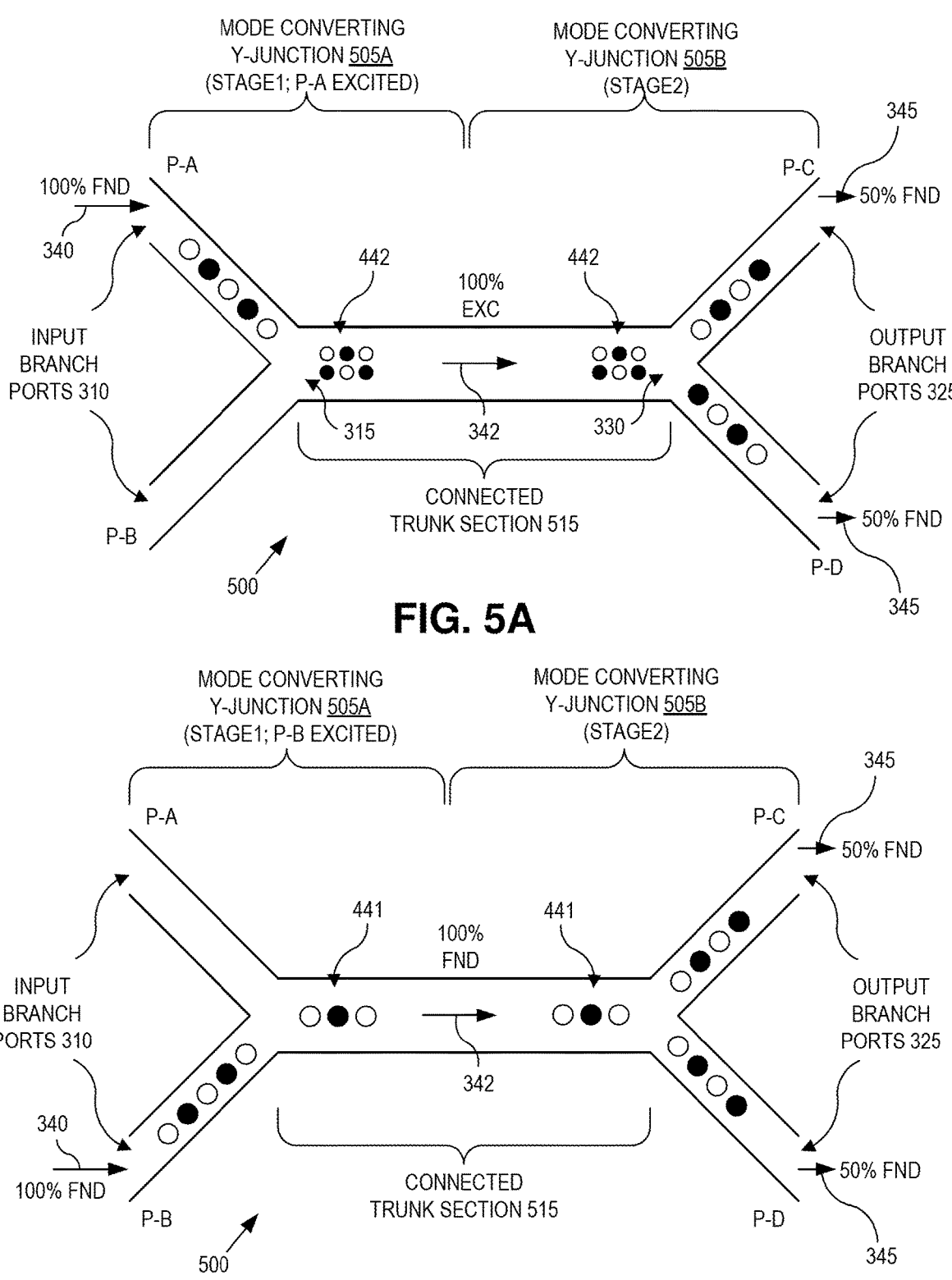
FIG. 5A is a functional block diagram illustrating a first operation of a low loss bi-directional 2×2 photonic splitter using two distinct mode converting Y-junctions linked trunk-to-trunk, in accordance with an embodiment of the disclosure.
FIG. 5B is a functional block diagram illustrating a second operation of the low loss bi-directional 2×2 photonic splitter using two distinct mode converting Y-junctions linked trunk-to-trunk, in accordance with an embodiment of the disclosure.

FIGS. 5A & 5B are functional block diagrams illustrating a low loss bi-directional 2×2 photonic splitter 500 using two distinct mode converting Y-junctions 505A and 505B linked trunk-to-trunk via connected trunk section 515, in accordance with an embodiment of the disclosure. Splitter 500 is another possible implementation of splitter 300. FIG. 5A illustrates operation of splitter 500 when input optical signal 340 is received on branch port P-A while FIG. 5B illustrates operation of splitter 500 when input optical signal 340 is received on branch port P-B. 2×2 photonic splitter 500 exhibits the same behavior at ports P-A, P-B, P-C, and P-D as splitter 400, but achieves this result without a mode phase shifter by using two mode converting Y-junctions each having a distinct mode converting region implemented with a distinct pattern.

Mode converting junction 505A (stage 1) is designed to treat input optical signal 340 differently dependent on the input branch port P-A or P-B upon which it is received. Referring to FIG. 5A, branch port P-A is excited by input optical signal 340 with all optical power propagating in the fundamental spatial mode. The mode converting region of mode converting Y-junction 505A converts all of the optical power of input optical signal 340 received on port P-A to higher order spatial mode 442. Of course, in practice, power conversion between modes may not be ideal (e.g., less than 1%, 2%, or 5% loss). Referring to FIG. 5B, branch port P-B is excited by input optical signal 340 with all optical power propagating in the fundamental spatial mode. However, in this situation the optical power is retained in the fundamental spatial mode 441 by mode converting Y-junction 505A.

Accordingly, the intermediate optical signal 342 has substantially all power in either the fundamental spatial mode or a higher order spatial mode dependent upon which input branch port receives input optical signal 340. Connected trunk section 515 does not include a spatial mode converter. As such, the intermediate optical signals 342 propagating in each spatial mode along connected trunk section 515 are not phase shifted relative to each other. In one embodiment, the length of connected trunk section 515 may be selected so as not to introduce a relative phase shift between the spatial modes at trunk port 330.

When the intermediate optical signals 342 reach trunk port 330 of the second stage mode converting Y-junction 505B, both the fundamental spatial mode 441 and higher order spatial mode 442 are power split to both output branch ports 325. In one embodiment, this power split is a 50/50 power split (ideally). However, as illustrated in FIG. 5A, higher order spatial mode 442 of the intermediate optical signals 342 is also converted back into the fundamental spatial mode with the power split between output branch ports 325. As can be seen from FIGS. 5A and 5B, the operation of 2×2 photonic splitter 500 is reciprocal and ideally lossless. In reverse operation, optical signals received on ports P-C or P-D will be converted 50/50 into fundamental and higher order spatial modes on connected trunk section 515. In turn, higher order spatial modes at trunk port 315 will be converted into the fundamental spatial mode and directed out port P-A while the fundamental spatial mode at trunk port 315 will be directed out port P-B.

It is noteworthy that mode converting Y-junction 505B exhibits the same functional behavior as mode converting Y-junction 405 illustrated in FIGS. 4A and 4D. Accordingly, in one embodiment, mode converting Y-junction 505B is implemented using mode converting Y-junction 405. However, mode converting Y-junction 505A is distinct from mode converting Y-junction 505B. FIG. 5C illustrates an s-matrix 550 and associated loss function L(x) for inverse design of mode converting Y-junction 505A. S-matrix 550 uses the same virtual port naming scheme as described above in FIG. 4B.

Figure 5D:
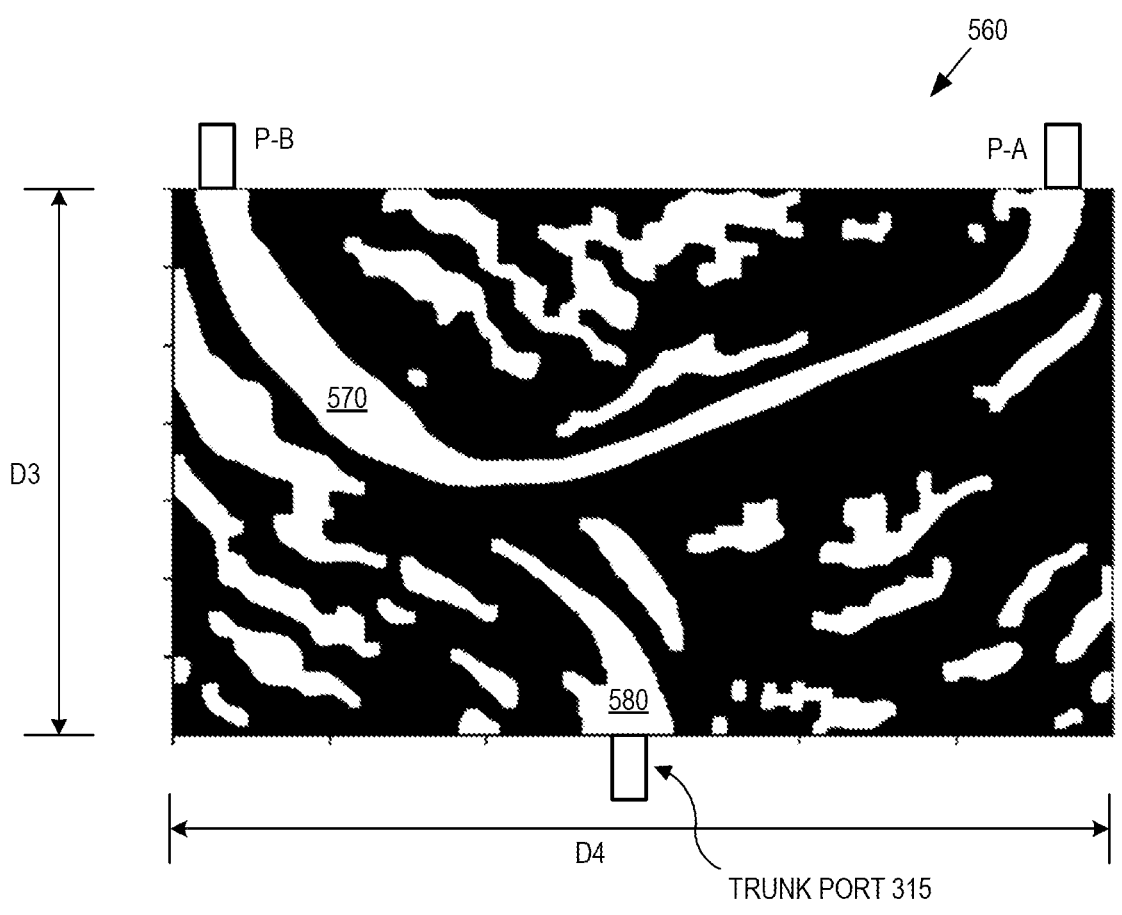
FIG. 5D illustrates an inverse designed pattern used to implement a first stage mode converting region of a 2×2 photonic splitter, in accordance with an embodiment of the disclosure.

FIG. 5D illustrates an inverse designed pattern 560, designed based upon the loss function L(x) illustrated in FIG. 5C, and used to implement the mode converting region of mode converting Y-junction 505A, in accordance with an embodiment of the disclosure. Pattern 560 may be implemented in a planar slab of semiconductor material (e.g., silicon and silicon dioxide) having approximate dimensions D3=7 μm and D4=24 μm. Of course, other dimensions may be implemented. As illustrated, pattern 560 includes an irregularly shaped channel 570 of higher index material (e.g., silicon) surrounded by lower index material (e.g., silicon dioxide). Irregularly shaped channel 570 extends continuously between input branch ports P-A and P-B. Furthermore, the illustrated embodiment of pattern 560 does not include a continuous channel of the higher index material extending between trunk port 315 and either input branch port 310 (P-A or P-B). Pattern 560 also includes a plurality of irregularly shaped islands of higher index material (white sections) disposed within the lower index material (black sections). Pattern 560 also includes an irregularly shaped fjord feature 580 of the higher index material adjacent to trunk port 315.

Figure 5E:
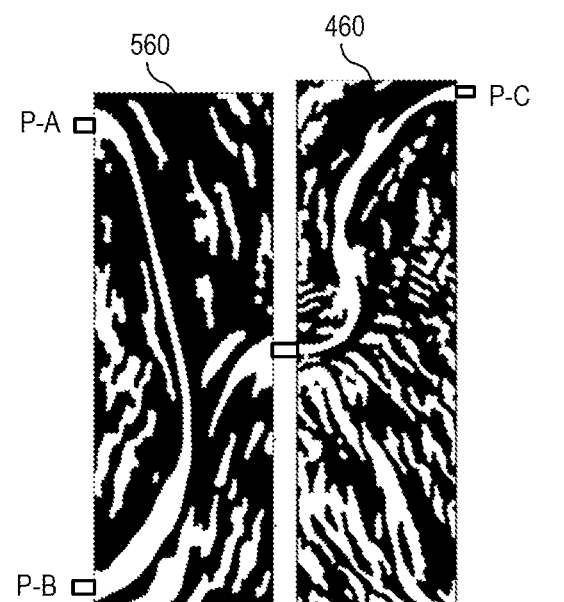
FIG. 5E illustrates two inverse designed patterns used to implement both mode converting Y-junction stages of a 2×2 photonic splitter, in accordance with an embodiment of the disclosure.

FIG. 5E illustrates how inverse designed patterns 460 and 560 may be coupled together trunk-to-trunk to implement 2×2 photonic splitter 500. FIG. 5E illustrates a 2×2 photonic splitter where the mode converting regions of both mode converting Y-junctions 505A and 505B are inverse designed. The inverse designed patterns 460 and 560 may be fabricated into planar waveguide sections of a photonic integrated circuit made of semiconductor material, such as silicon and silicon dioxide.

Figure 5F:
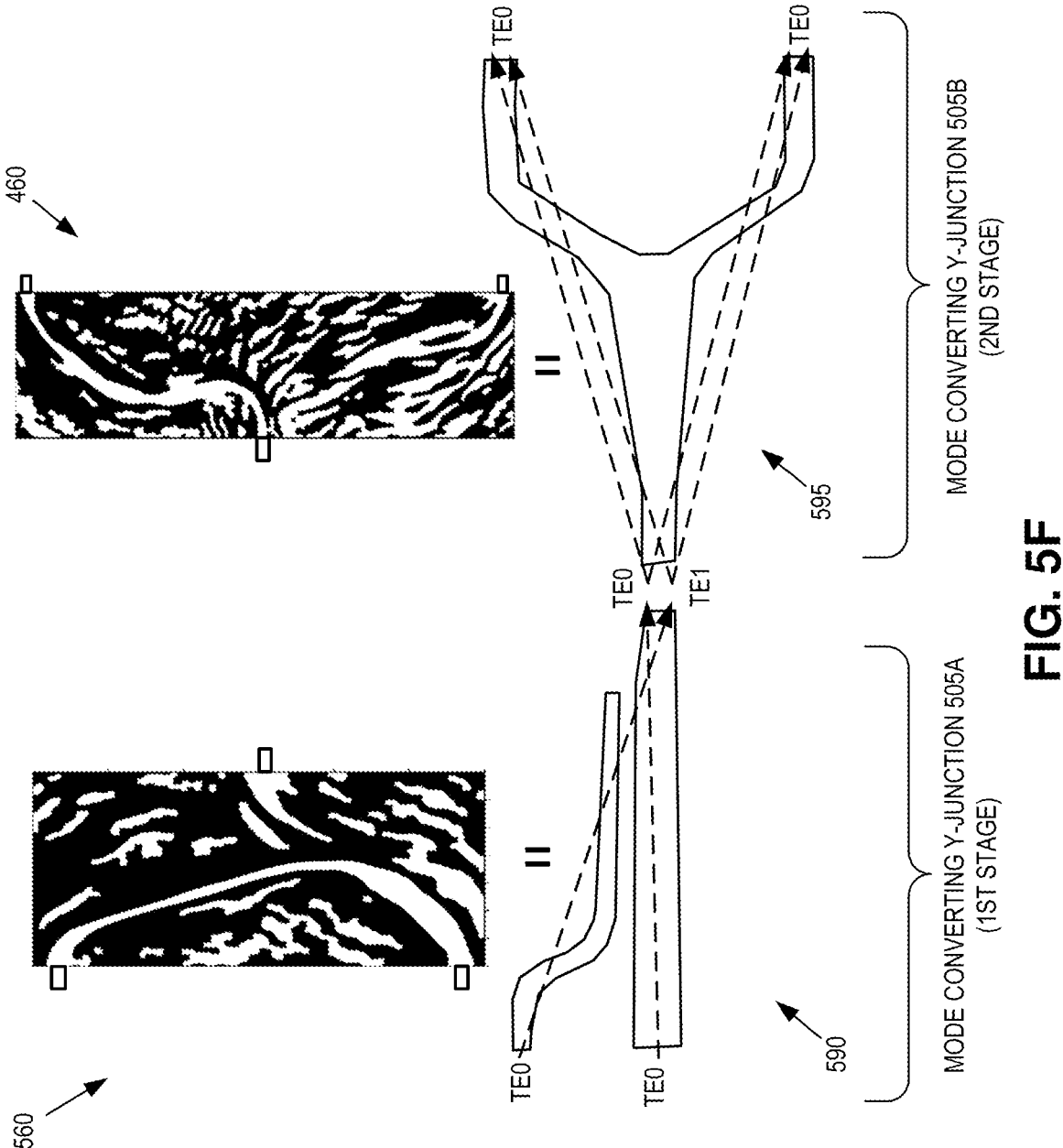
FIG. 5F illustrates how inverse designed patterns and conventional waveguide patterns may be interchanged/intermixed to implement either one of the mode converting Y-junctions, in accordance with an embodiment of the disclosure.

FIG. 5F illustrates how one or both of patterns 560 and 460 may be interchanged with conventional waveguide patterns 590 and 595, respectively, to implement the 2×2 photonic splitter 500. Conventional patterns 590 and 595 may be implemented with planar waveguides such as rib or ridge waveguide structures. Accordingly, the mode converting region of mode converting Y-junction 505A may be implemented with either pattern 560 or 590 and the mode converting region of mode converting Y-junction 505B may be implemented with either pattern 460 or 595. Correspondingly, two instances of conventional pattern 595 may be coupled trunk-to-trunk with an intervening mode phase shifter 410 to implement 2×2 photonic splitter 400. Of course, embodiments of hybrid 2×2 photonic splitters may be put into practice with one of the stages implemented with the conventional waveguide counterpart illustrated in FIG. 5F while the other stage is implemented with the inverse design pattern.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A 2×2 photonic splitter, comprising:
a first stage mode converting Y-junction including:
    input branch ports adapted to receive an input optical signal propagating in a fundamental spatial mode at either of the input branch ports;
    a first trunk port; and
    a first mode converting region optically coupling the input branch ports to the first trunk port, the first mode converting region adapted to convert at least a first power portion of the fundamental spatial mode of the input optical signal when received via at least one of the input branch ports to a higher order spatial mode at the first trunk port;
a second stage mode converting Y-junction including:
    output branch ports adapted to emit output optical signals each propagating in the fundamental spatial mode in response to the input optical signal;
    a second trunk port; and
    a second mode converting region optically coupling the output branch ports to the second trunk port, wherein the second mode converting region includes at least two materials arranged into a first pattern that splits second power portions from each of the fundamental and higher order spatial modes received at the second trunk port into each of the output branch ports as the output optical signals; and
a connected trunk section photonically linking the first and second trunk ports.

2. The 2×2 photonic splitter of claim 1, wherein the first pattern is shaped to power split either of the fundamental or higher order spatial modes received at the second trunk port from the connected trunk section approximately 50/50 to the output branch ports while converting an optical power in the higher order spatial mode to the fundamental spatial mode of the output optical signals.

3. The 2×2 photonic splitter of claim 1, wherein the first pattern comprises an inverse designed pattern that is non-symmetrical and includes irregularly shaped features defined by the at least two materials.

4. The 2×2 photonic splitter of claim 1, wherein the first pattern includes a first irregularly shaped channel of a higher index material surrounded by a lower index material, wherein the first irregularly shaped channel extends continuously and circuitously from the second trunk port to one of the output branch ports.

5. The 2×2 photonic splitter of claim 4, wherein the first pattern further includes a plurality of irregularly shaped islands of the higher index material disposed within the lower index material, wherein the irregularly shaped islands are separate and distinct from the first irregularly shaped channel.

6. The 2×2 photonic splitter of claim 4, wherein the first pattern does not include a continuous channel of the higher index material extending between the second trunk port and another of the output branch ports.

7. The 2×2 photonic splitter of claim 1, wherein the connected trunk section includes a mode phase shifter that phase shifts the higher order spatial mode propagating through the connected trunk section by pi/2 radians relative to the fundamental spatial mode propagating through the connected trunk section.

8. The 2×2 photonic splitter of claim 7, wherein the mode phase shifter comprises a ridge waveguide or a rib waveguide connecting the first and second trunk ports.

9. The 2×2 photonic splitter of claim 7, wherein the mode phase shifter comprises an inverse designed mode phase shifter.

10. The 2×2 photonic splitter of claim 7, wherein the first mode converting region is adapted to convert the first power portion of the fundamental spatial mode of the input optical signal to the higher order spatial mode at the first trunk port, regardless on which of the input branch ports the input optical signal is received.

11. The 2×2 photonic splitter of claim 7, wherein the first mode converting region also includes the at least two materials arranged into the first pattern.

12. The 2×2 photonic splitter of claim 1, wherein the first mode converting region comprises the at least two materials arranged into a second pattern distinct from the first pattern.

13. The 2×2 photonic splitter of claim 12, wherein the first mode converting region is adapted to convert substantially all power of the fundamental spatial mode of the input optical signal received at a first one of the input branch ports to the higher order spatial mode at the first trunk port while retaining substantially all power of the fundamental spatial mode of the input optical signal received at a second one of the input branch ports in the fundamental spatial mode at the first trunk port.

14. The 2×2 photonic splitter of claim 12, wherein the second pattern includes a second irregularly shaped channel of a higher index material surrounded by a lower index material, wherein the second irregularly shaped channel extends continuously between the input branch ports.

15. The 2×2 photonic splitter of claim 14, wherein the second pattern does not include a continuous channel of the higher index material extending between the first trunk port and either of the input branch ports.

16. A method of operation of a 2×2 optical splitter, the method comprising:
receiving a first input optical signal at a first input optical port of the 2×2 optical splitter, wherein the first input optical signal propagates with a first optical power in a fundamental spatial mode;
converting at least a portion of the first optical power to a higher order spatial mode of a first intermediate optical signal with a first mode converting Y-junction;
splitting the first intermediate optical signal into first output optical signals with a second mode converting Y-junction of the 2×2 optical splitter; and
converting a second optical power of the first intermediate optical signal in the higher order spatial mode back into the fundamental spatial mode of the first output optical signals with the second mode converting Y-junction.

17. The method of claim 16, wherein the portion comprises substantially all of the first optical power, the method further comprising:
receiving a second input optical signal at a second input optical port of the 2×2 optical splitter, wherein the second input optical signal propagates with a third optical power in the fundamental spatial mode;

directing the second input optical signal to a trunk port of the second mode converting Y-junction while maintaining the third optical power in the fundamental spatial mode; and splitting the second input optical signal into second output optical signals with the second mode converting Y-junction.

18. The method of claim 16, wherein the portion comprises approximately a first half of the first optical power, the method further comprising:

retaining approximately a second half of the first optical power of the first input optical signal in the fundamental spatial mode of a second intermediate optical signal;

applying a pi/2 relative phase shift between the higher order spatial mode of the first intermediate optical signal and the fundamental spatial mode of the second intermediate optical signal; and splitting the second intermediate optical signal with the second mode converting Y-junction of the 2×2 optical splitter.

19. The method of claim 16, wherein the first and second mode converting Y-junctions are identical structures coupled trunk-to-trunk together via a mode phase shifter that applies a pi/2 relative phase shift between the fundamental and higher order spatial modes.

20. The method of claim 16, wherein the second mode converting Y-junction comprises an inverse designed structure of at least two materials of differing refractive index arranged into a pattern that is non-symmetrical and includes irregularly shaped features.

\* \* \* \* \*